US012664075B2

(12) United States Patent
Thangavelu et al.

(10) Patent No.: US 12,664,075 B2
(45) Date of Patent: Jun. 23, 2026

(54) METHOD AND SYSTEM FOR SMART TEST EXECUTION IN A NETWORK TEST AUTOMATION PLATFORM

(71) Applicant: Infosys Limited, Bangalore (IN)

(72) Inventors: Balaji Thangavelu, Bangalore (IN); Sreekanth Sreedevi Sasidharan, Bangalore (IN); Basavaraj Veerappa Somawagol, Bangalore (IN)

(73) Assignee: Infosys Limited, Bangalore (IN)

( * ) Notice: Subject to any disclaimer, the term of this patent is extended or adjusted under 35 U.S.C. 154(b) by 229 days.

(21) Appl. No.: 18/437,717

(22) Filed: Feb. 9, 2024

(65) Prior Publication Data

US 2025/0181722 A1      Jun. 5, 2025

(30) Foreign Application Priority Data

Dec. 1, 2023    (IN) .............................. 202341081645

(51) Int. Cl.
G06F 11/3668        (2025.01)

(52) U.S. Cl.
CPC .... G06F 11/3688 (2013.01); G06F 2221/034 (2013.01)

(58) Field of Classification Search
CPC ........................ G06F 11/3688; G06F 2221/034
See application file for complete search history.

(56) References Cited

U.S. PATENT DOCUMENTS

| | | | | |
|---|---|---|---|---|
| 7,506,312 | B1 * | 3/2009 | Girolami-Rose | ......... G06F 8/71 |
| | | | | 717/124 |
| 2015/0082090 | A1 * | 3/2015 | Holden | ............... G06F 11/2294 |
| | | | | 714/25 |
| 2015/0309918 | A1 * | 10/2015 | Raghavan | ........... G06F 11/3688 |
| | | | | 714/38.1 |
| 2017/0161180 | A1 * | 6/2017 | Raghavan | ........... G06F 11/3684 |

(Continued)

FOREIGN PATENT DOCUMENTS

| | | | |
|---|---|---|---|
| CN | 121092456 A | * | 12/2025 |
| IN | 201303796-14 | * | 8/2013 |

OTHER PUBLICATIONS

Requirements Based Test Prioritization Using Risk Factors: An Industrial Study (Year: 2014).*

*Primary Examiner* — Wei Y Mui
*Assistant Examiner* — Travis Viet Tran
(74) *Attorney, Agent, or Firm* — Finnegan, Henderson, Farabow, Garrett & Dunner, LLP

(57)        ABSTRACT

The disclosure relates to system and method for smart test execution in a network test automation platform. The method includes retrieving set of parameter values for each of plurality of test cases in test suite corresponding to set of risk parameters based on latest release of product code. The method further includes calculating risk index for each of plurality of test cases based on set of parameter values and predefined set of weightage scores. The method further includes determining execution order of plurality of test cases based on calculated risk index. The method further (Continued)

includes executing set of priority test cases from plurality of test cases based on execution order and predefined threshold risk escape value. The method further includes dynamically rendering in real-time, one or more live charts based on current risk escape value upon execution of the set of priority test cases via GUI.

20 Claims, 11 Drawing Sheets

(56) References Cited

U.S. PATENT DOCUMENTS

| | | | | |
|---|---|---|---|---|
| 2017/0249240 A1 * | 8/2017 | Splichal | ............... | G06F 11/3672 |
| 2017/0262361 A1 * | 9/2017 | Francis | ................ | G06F 11/3672 |
| 2020/0341888 A1 * | 10/2020 | Sridhar | ............... | G06F 11/3692 |
| 2021/0263842 A1 * | 8/2021 | Sekhar | .................... | G06N 20/00 |

* cited by examiner

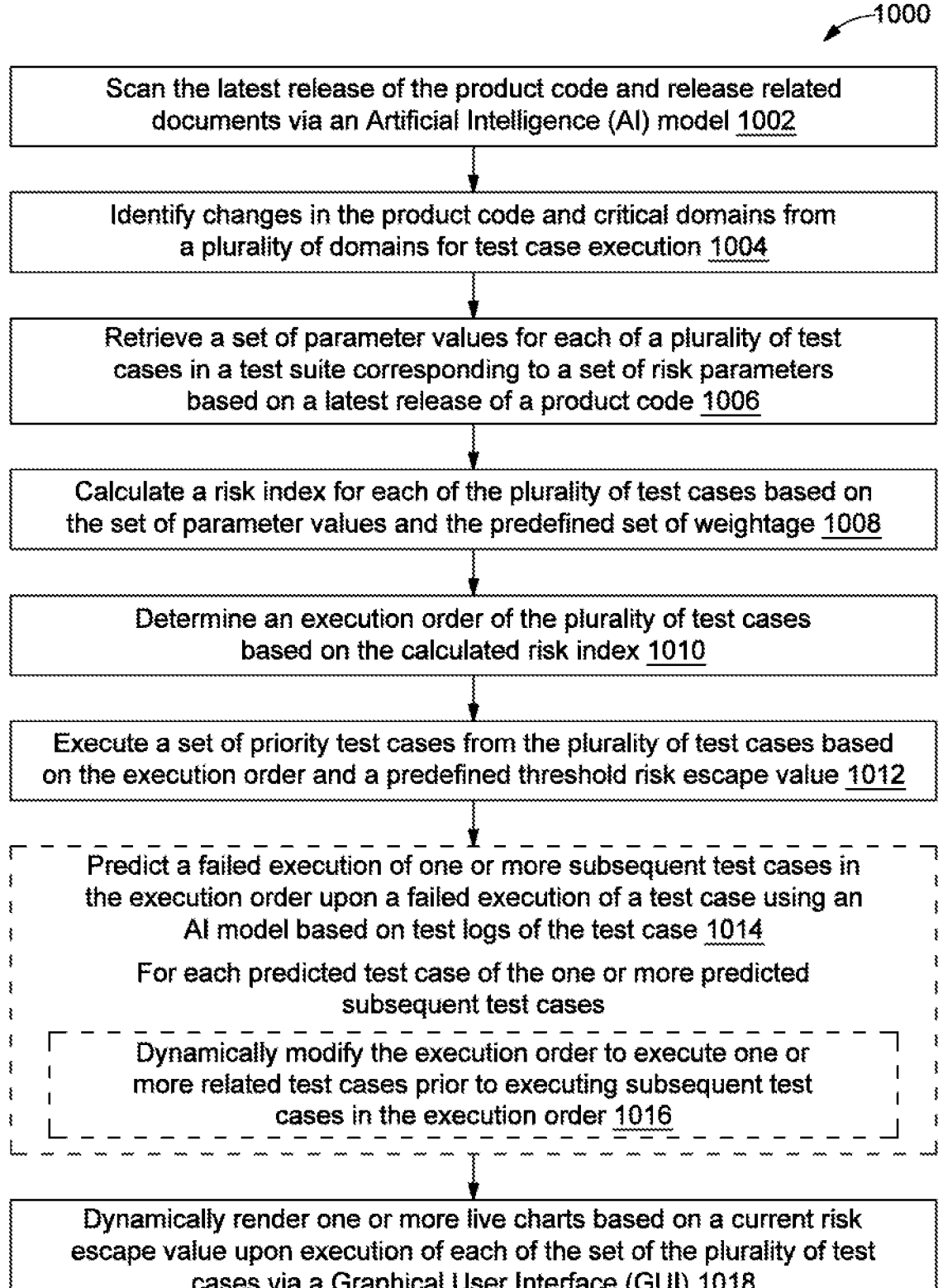

1000

Scan the latest release of the product code and release related documents via an Artificial Intelligence (AI) model 1002

Identify changes in the product code and critical domains from a plurality of domains for test case execution 1004

Retrieve a set of parameter values for each of a plurality of test cases in a test suite corresponding to a set of risk parameters based on a latest release of a product code 1006

Calculate a risk index for each of the plurality of test cases based on the set of parameter values and the predefined set of weightage 1008

Determine an execution order of the plurality of test cases based on the calculated risk index 1010

Execute a set of priority test cases from the plurality of test cases based on the execution order and a predefined threshold risk escape value 1012

Predict a failed execution of one or more subsequent test cases in the execution order upon a failed execution of a test case using an AI model based on test logs of the test case 1014

For each predicted test case of the one or more predicted subsequent test cases

Dynamically modify the execution order to execute one or more related test cases prior to executing subsequent test cases in the execution order 1016

Dynamically render one or more live charts based on a current risk escape value upon execution of each of the set of the plurality of test cases via a Graphical User Interface (GUI) 1018

FIG. 10

METHOD AND SYSTEM FOR SMART TEST EXECUTION IN A NETWORK TEST AUTOMATION PLATFORM

CROSS-REFERENCE TO RELATED APPLICATIONS

This application claims the benefit of Indian Patent Application number 202341081645, filed Dec. 1, 2023, which is incorporated by reference in its entirety.

TECHNICAL FIELD

The present disclosure relates to test automation, and more particularly to a method and system for smart test execution in a network test automation platform.

BACKGROUND

Networking technology is inherently built in a layered architecture, where each layer is developed by different Original Equipment Manufacturers (OEMs) following their own implementation of standards in custom programming. Similarly, test tools are designed to test specific targeted domains or network layers using custom scripting. When a telecom service provider builds an end-to-end network by selecting various network elements, they end up having many test tools and frameworks in their testing environment, making end-to-end testing a cumbersome task. As network complexity grows, so does the need for rigorous testing to ensure stability, security, and performance.

Network test automation platforms have emerged as vital tools for network administrators and engineers, enabling the automation of tests for diverse network components and configurations. Typically, network test automation platforms automate tests in three broad stages-test plan and design, test execution, and test reporting. However, each of the three stages are faced with their own sets of challenges. For instance, challenges associated with test planning include no use of cognitive data, lack of requirements traceability between features and related test cases, need for integration of many geographically separated labs without a centralized testing solution, inefficient test suite selection, duplication of test cases across suites, lack of a uniform framework or scripting method, need for skills in more than one scripting languages, lack of smart test suite selection, and potential failures and historic data analysis not considered in test design. Challenges associated with test execution include long execution times to cover large set of automated test suites (typically about 4-8 days), integration of different domains (voice, data, Wi-Fi, video, etc.) into a single product regression, lack of dynamic data analysis for real time feedback and adjustments of test execution, traditional way of development of complex scripts for test automation, and use of many frameworks in the networks tend to increase the overall cycle time. Challenges associated with test reporting include integration of many test tools into single frameworks and generation of uniform reports, integration of different test management platforms and having uniform reports/dashboards, and dynamic data analytics and insightful reports for better trouble-shooting and fixing.

Due to dynamic business demands resulting in complex networks and devices, there has been a nonlinear rise in the test suites aiming to address the above challenges. However, majority of network test automation frameworks available today are mainly catering to certain network domains and technology stacks only. Moreover, they are addressing challenges towards certain stages of the testing lifecycle only, rather than addressing the problems across the entire E2E network testing lifecycle. Such frameworks support test scripting in a single language only. Commercial frameworks generally have their own orchestration logic and it is not possible to integrate the testing scripts written in other technology frameworks. Also, traditional way of development of test scripts and lack of cognitive capabilities may lead to extended test cycles, increase in defect leaks, and an overall increase in the network testing cost.

The present invention is directed to overcome one or more limitations stated above or any other limitations associated with the known arts.

SUMMARY

In one embodiment, a method for smart test execution in a network test automation platform is disclosed. In one example, the method may include retrieving a set of parameter values for each of a plurality of test cases in a test suite corresponding to a set of risk parameters based on a latest release of a product code. Further, the method may include calculating a risk index for each of the plurality of test cases based on the set of parameter values and a predefined set of weightage scores. Further, the method may include determining an execution order of the plurality of test cases based on the calculated risk index. Further, the method may include executing a set of priority test cases from the plurality of test cases based on the execution order and a predefined threshold risk escape value. The risk escape value is a sum of risk indices of unexecuted test cases starting from bottom of the execution order. Upon execution of the set of priority test cases, the risk escape value reaches the predefined threshold risk escape value and execution of remaining of the plurality of test cases is halted. The executing the set of priority test cases may include dynamically modifying the execution order upon a failed execution of a test case to execute one or more related test cases prior to executing subsequent test cases in the execution order. The method may further include dynamically rendering in real-time one or more live charts based on a current risk escape value upon execution of each of the set of priority test cases via a Graphical User Interface (GUI).

In another embodiment, a system for smart test execution in a network test automation platform is disclosed. In one example, the system may include a processing circuitry and a memory communicatively coupled to the processing circuitry. The memory may store processor-executable instructions, which, on execution, may cause the processing circuitry to retrieve a set of parameter values for each of a plurality of test cases in a test suite corresponding to a set of risk parameters based on a latest release of a product code. The processor-executable instructions, on execution, may further cause the processing circuitry to calculate a risk index for each of the plurality of test cases based on the set of parameter values and a predefined set of weightage scores. The processor-executable instructions on execution may further cause the processing circuitry to determine an execution order of the plurality of test cases based on the calculated risk index. The processor-executable instructions, on execution, may further cause the processing circuitry to execute a set of priority test cases from the plurality of test cases based on the execution order and a predefined threshold risk escape value. The risk escape value is a sum of risk indices of unexecuted test cases starting from bottom of the execution order. Upon execution of the set of priority test cases, the risk escape value reaches the predefined threshold risk escape value and execution of remaining of the plurality of test cases is halted. To execute the set of priority test cases, the processor-executable instructions, on execution, may further cause the processing circuitry to dynamically modify the execution order upon a failed execution of a test case to execute one or more related test cases prior to executing subsequent test cases in the execution order. The processor-executable instructions, on execution, may further cause the processing circuitry to dynamically render in real-time one or more live charts based on a current risk escape value upon execution of each of the set of priority test cases via a GUI.

In one embodiment, a non-transitory computer-readable medium storing computer-executable instructions for smart test execution in a network test automation platform is disclosed. In one example, the stored instructions, when executed by a processor, may cause the processor to perform operations including retrieving a set of parameter values for each of a plurality of test cases in a test suite corresponding to a set of risk parameters based on a latest release of a product code. Further, the operations may include calculating a risk index for each of the plurality of test cases based on the set of parameter values and a predefined set of weightage scores. Further, the operations may include determining an execution order of the plurality of test cases based on the calculated risk index. Further, the operations may include executing a set of priority test cases from the plurality of test cases based on the execution order and a predefined threshold risk escape value. The risk escape value is a sum of risk indices of unexecuted test cases starting from bottom of the execution order. Upon execution of the set of priority test cases, the risk escape value reaches the predefined threshold risk escape value and execution of remaining of the plurality of test cases is halted. The executing the set of priority test cases may include dynamically modifying the execution order upon a failed execution of a test case to execute one or more related test cases prior to executing subsequent test cases in the execution order. The operations may further include dynamically rendering in real-time one or more live charts based on a current risk escape value upon execution of each of the set of priority test cases via a GUI.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 10 illustrates a flow diagram of an exemplary process for smart test execution in a network test automation platform, in accordance with some embodiments of the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
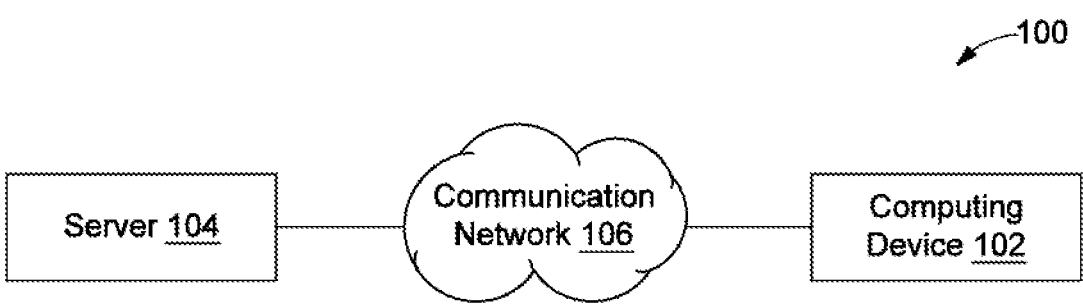
FIG. 1 illustrates a block diagram of an environment for smart test execution in a network test automation platform, in accordance with an exemplary embodiment of the present disclosure.

FIG. 1 is a block diagram that illustrates an environment 100 for smart test execution in a network test automation platform, in accordance with an exemplary embodiment of the present disclosure. The environment 100 may include a computing device 102 and a server 104.

The computing device 102 and the server 104 are configured to communicate with each other via a communication network 106 for sending and receiving various data. Examples of the communication network 106 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

Examples of the computing device 102 may include, but are not limited to devices with high computing GPUs, a server, a smartphone, an application server, a laptop, a desktop, a mobile phone, a smart wearable, or the like. The computing device 102 may be configured to execute a plurality of test cases in a network test automation platform. Further, to execute the plurality of test cases, the computing device 102 may perform various operations. For example, the operations may include retrieving parameter values, determining a risk index of each of the plurality of test cases, determining an execution order for the plurality of test cases, and the like.

Examples of the server 104 may include, but are not limited to, database servers, mail servers, print servers, file servers, web servers, application servers, and game servers, or the like. The server 104 may be configured to store a plurality of parameters of each of the plurality of test cases. Further, the server 104 may perform various operations. For example, the operations may include storing the parameter values, storing the plurality of test cases, storing the chart generated by the computing device 102, and the like.

By way of an example, in some embodiments, the computing device 102 may retrieve a set of parameter values for each of a plurality of test cases in a test suite corresponding to a set of risk parameters based on a latest release of a product code. The set of risk parameters may include defect count, defect age, defect severity, execution count, execution pattern, failed test cases, domain, priority, and effort saved per execution. It should be noted that the server 104 may store the set of parameter values corresponding to the set of risk parameters, which may be retrieved by the computing device 102. In some embodiments, the set of parameters stored in the server 104 may be transmitted to the computing device 102 through the communication network 106.

Further, the computing device 102 may calculate a risk index for each of the plurality of test cases based on the set of parameter values and a predefined set of weightage scores. The risk index of a test case may be a numerical score (for example, a whole number, an integer, or a real number) indicative of complexity of the test case (for example, complexity may imply a probability that an outcome of the test case may be a failure). In some embodiments, the risk index may be a positive numerical value (e.g., 1, 2.5, 3%, 0.03, etc.). Alternately, the risk index may be a negative numerical value (e.g., −1, −2.5, −3%, −0.03, etc.). In an embodiment, the risk index may be a percentage value of a cumulative risk index (i.e., sum total of risk indices of the plurality of test cases) of the plurality of test cases. In such an embodiment, risk indices of the plurality of test cases of the test suite may add up to 1, 10, 100, etc. For example, if the sum of the risk indices of the plurality of test cases is 100, execution of each of the plurality of test cases implies that 100% of risk extent has been covered.

In order to calculate the risk index, the computing device 102 may scan the latest release of the product code and release related documents via an Artificial Intelligence (AI) model. Further, the computing device 102 may identify changes in the product code and critical domains from a plurality of domains for test case execution. It should be noted that the critical domains are assigned a higher weightage score than remaining of the plurality of domains during risk index calculation. In an embodiment, the changes in the product code and the critical domains may be identified based on a comparison between the latest (i.e., current) release of the product code and a previous release (i.e., a prior version) of the product code.

Further, the computing device 102 may determine an execution order of the plurality of test cases based on the calculated risk index. The execution order may be determined such that the test cases that correspond to a high risk are executed in the beginning. For example, when the risk indices are expressed as percentage values, a high risk index may correspond to high risk. In such cases, the test case with the highest risk index will be executed first among the plurality of test cases. Then, the test case with the second highest risk index will be executed. This will continue until the cumulative risk index of the executed test cases reaches a predefined threshold. Here, the cumulative risk index will increase after each test case execution and will indicate that high risk test cases have been executed. Alternatively, the execution of high risk test cases will continue until the cumulative risk index of the remaining of the plurality of test cases (i.e., the unexecuted test cases) reaches a predefined threshold. Here, the cumulative risk index (i.e., the risk escape value) will decrease after each test case execution and will indicate the risk that has not been covered.

Execution of each of the plurality of test cases after every release is not an optimal testing method as it is time consuming. As will be appreciated by those skilled in the art, executing each of the plurality of test cases of a test suite may take up to 4-8 days. By calculating a risk associated with each of the plurality of test cases, it is possible to successfully test the product release for a majority of high risk test cases in less time (less than 24 hours) with a tradeoff of a certain allowable risk escape value.

For example, a test suite for a product includes 4 test cases-test case 1, test case 2, test case 3, and test case 4. After analyzing the latest product release via the AI model, changes and critical domains may be identified. Further, the risk index of each of the test cases is calculated. The risk indices calculated for test case 1, test case 2, test case 3, and test case 4 are 10%, 20%, 25%, and 45%, respectively. The execution order for the 4 test cases determined will be in a descending order of the risk indices. Thus, the 4 test cases will be executed in the order: test case 4, test case 3, test case 2, and test case 1.

The computing device 102 may execute a set of priority test cases from the plurality of test cases based on the execution order and a predefined threshold risk escape value. The risk escape value is a sum of risk indices of unexecuted test cases starting from bottom of the execution order. It should be noted that upon execution of the set of priority test cases, the risk escape value reaches the predefined threshold risk escape value and execution of remaining of the plurality of test cases is halted. In an embodiment, a criterion may be defined that the execution of the plurality of test cases will be halted once the sum of risk indices of a set of unexecuted test cases (starting from the bottom-most unexecuted test case to the top-most unexecuted test case in the execution order) reaches the predefined threshold risk escape value. A current risk escape value may be dynamically calculated upon execution of each of the set of priority test cases.

Also, a risk burndown value may be calculated after execution of each of the set of priority test cases. The risk burndown value is the sum of the risk index of each executed test case of the set of priority test cases. The risk burndown value may imply a percentage of risk covered with respect to total risk of the test suite (i.e., sum of the risk indices of the plurality of test cases). In other words, upon execution of each of the set of priority test cases, the risk burndown value is equal to sum of risk indices of the set of priority test cases. A current risk burndown value may be dynamically calculated upon execution of each of the set of priority test cases.

In continuation of the example above, a predefined threshold risk escape value may be, for example, 30%. Then, a set of priority test cases that may be executed may include test case 4 and test case 3. This is because the sum of the risk indices of test case 4 and test case 3 is 70%. The goal is to execute minimal test cases in the execution order such that the execution is halted once the risk escape value crosses the predefined threshold risk escape value. Thus, the remaining test cases (i.e., test case 1 and test case 2) will not be required to be executed as, starting from the bottom of the execution order, the sum of the risk indices of these cases is 30%, which is equal to the predefined threshold risk escape value. Thus, test case 1 and test case 2 will not be executed. Upon execution of the set of priority test cases (i.e., test case 4 and test case 3), the risk burndown value will be the sum of risk indices of the set of priority test cases, i.e., 70%.

Figure 2:
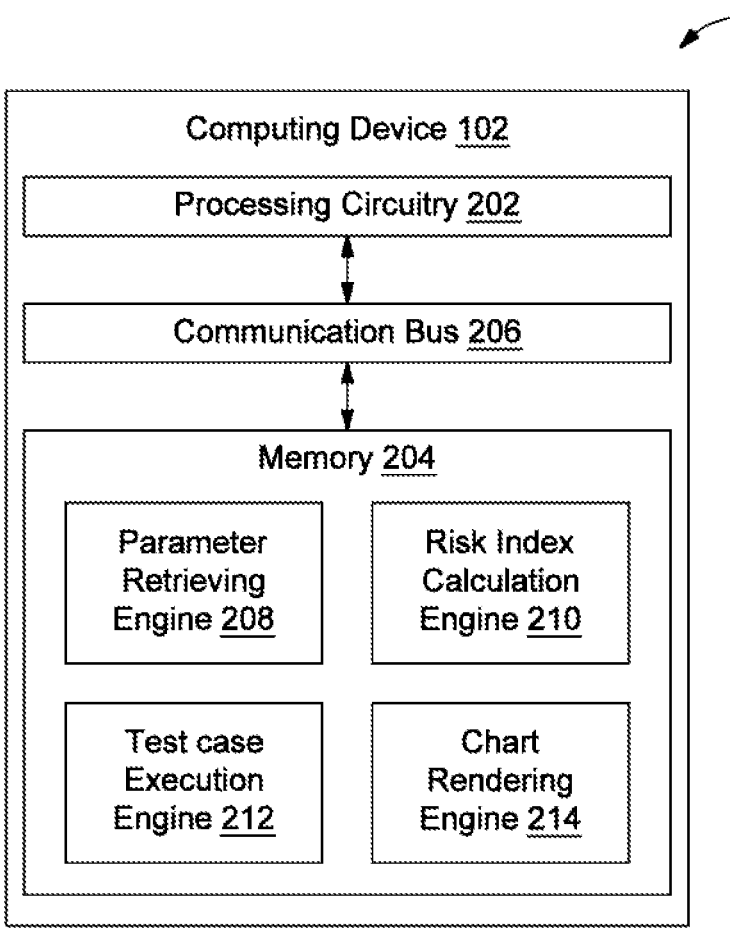
FIG. 2 illustrates a block diagram of various engines within a computing device configured for smart test execution in a network test automation platform, in accordance with an exemplary embodiment of the present disclosure.

In some embodiments, the computing device 102 may dynamically modify the execution order upon a failed execution of a test case to execute one or more related test cases prior to execute subsequent test cases in the execution order as explained in detail in FIG. 2.

In an embodiment, the computing device 102 may dynamically render one or more live charts based on a current risk escape value upon execution of each of the set of priority test cases via a Graphical User Interface (GUI) in real-time. The GUI may be implemented in the computing device 102 or the system 100 may include a display configured to render a plurality of charts. Moreover, functionalities of the computing device 102 is further explained in detail in conjunction with FIG. 2.

FIG. 2 is a block diagram of various engines within computing device 102 configured for smart test execution in a network test automation platform, in accordance with an exemplary embodiment of the present disclosure. FIG. 2 is explained in conjunction with FIG. 1. The computing device 102 may include a processing circuitry 202, and a memory 204 communicatively coupled to the processing circuitry 202 via a communication bus 206.

The memory 204 may store various data that may be captured, processed, and/or required by the computing device 102. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

data, presenting the generated charts on a GUI and the like. The memory 204 may include a parameter retrieving engine 208, and a risk index calculation engine 210, a test case execution engine 212, and a chart rendering engine 214. The memory 204 may also include a data store (not shown in FIG. 2) for storing data and intermediate results generated by the engines 208-214.

The parameter retrieving engine 208 may be configured to retrieve a set of parameter values for each of a plurality of test cases in a test suite corresponding to a set of risk parameters based on a latest release of a product code. By way of an example, the set of risk parameters may include, but may not be limited to, defect count, defect age, defect severity, execution count, execution pattern, failed test cases, domain, priority, and effort saving per execution. When a new product/firmware release is received, the parameter retrieving engine 208 may inspect release notes and other release related documents through an AI model. Further, the parameter retrieving engine 208 may identify affected area/code of the product and may tag certain features/domains as critical for the current execution. Critical domains and features may be assigned a higher weightage score in later processing by the system 200.

In an exemplary embodiment, in case a product is under test, the parameter retrieving engine 208 may retrieve a set of parameter values corresponding to each of the parameter of the plurality of test cases associated with the product under test. In an embodiment, the parameter retrieving engine 208 may receive the set of parameter values through an input device from a user. In some embodiments, he set of parameter values may be provided in a tabular format, for example, as shown in table 1.

TABLE 1

A table including the set of parameter values corresponding to the set of risk parameters.

| Test Case ID | Test Case Description | Tag | Priority | Associated Defect ID | Severity | Status | Risk Index | Manual Effort | Auto Execution Time | Fail Count |
|---|---|---|---|---|---|---|---|---|---|---|
| TCID__ 001 | Test Case 1 | Wi-Fi | P1 | OFW-4911 | S4 | Open | 3 | 12:00 | 3:00 | 0 |
| TCID__ 002 | Test Case 2 | CPE | P3 | OFW-4925 | S4 | Resolved | 0.5 | 7:00 | 4:00 | 0 |
| TCID__ 003 | Test Case 3 | 5G | P1 | OFW-4942 | S3 | Open | 2 | 15:00 | 4:00 | 0 |
| TCID__ 004 | Test Case 4 | CPE | P2 | OFW-4943 | S3 | Open | 0.75 | 5:00 | 1:20 | 0 |
| TCID__ 005 | Test Case 5 | Wi-Fi | P2 | OFW-4908 | S3 | Open | 1.25 | 15:00 | 2:35 | 2 |
| TCID__ 006 | Test Case 6 | UI | P4 | F3896 SI-1944 | S4 | Open | 1.5 | 10:00 | 1:02 | 0 |
| TCID__ 007 | Test Case 7 | UI | P3 | F5685 SI-997 | S4 | Resolved | 0.5 | 8:00 | 1:07 | 0 |
| TCID__ 008 | Test Case 8 | CPE | P1 | OFW-4907 | S2 | Resolved | 1.25 | 11:00 | 2:00 | 3 |
| TCID__ 009 | Test Case 9 | Voice | P2 | OFW-4933 | S3 | Open | 0.75 | 10:00 | 7:00 | 0 |
| TCID__ 010 | Test Case 10 | Through-put | P2 | OFW-4932 | S3 | Open | 1.5 | 2:10:00 | 1:45:00 | 1 |

The memory 204 may also store processor-executable instructions. The processor-executable instructions, when executed by the processing circuitry 202, may cause the processing circuitry 202 to implement one or more embodiments of the present disclosure such as, but not limited to, retrieve a plurality of parameters values corresponding to the plurality of test cases, calculating the risk index for each of the plurality of test case, determine the execution order of the test cases, executing the test cases, generating the chart The risk index calculation engine 210 may be configured to calculate a risk index for each of the plurality of test cases based on the set of parameter values and the predefined set of weightage scores. It should be noted that the critical domains identified by the parameter retrieving engine 208 may be assigned a higher weightage score than remaining of the plurality of domains during risk index calculation. The predefined set of weightage scores may be used internally by the system 200 to calculate the risk index.

In some embodiments, the risk index calculation engine 210 may be configured to determine an execution order of the plurality of test cases based on the calculated risk index. The execution priority may be given to the test cases with high risk index as such test cases may be more vulnerable to failure. The plurality of test cases of the test suite may be sorted in descending order of the risk index so that high risk test cases are covered earlier in a test cycle along with marked critical test cases for the test cycle.

In an exemplary embodiment, the risk index calculation engine 210 may calculate the risk index of each of the test case of the product under test using an AI model. The risk index calculation engine 210 may calculate the risk index based on the weightage and value of each of the parameter for each of the test case of the product under test. The risk index calculation engine 210 may calculate the risk index for each of the test case at a pre-defined frequency or with addition or removal of at least one of the test cases. Further, the risk index calculation engine 210 may arrange the plurality of test cases of the product under test in a descending order with respect to the corresponding risk index i.e., the test case with the highest risk index is placed on top of the execution order and the test case with the lowest risk index is placed at bottom of the execution order.

In an exemplary embodiment, the risk index may be calculated based on the parameters value and the predefined weightage scores. The defect count may be directly proportional to the risk index, recent defects may be assigned higher weightage with respect to the risk index, high severity defects may be assigned higher weightage with respect to the risk index, high execution count may be assigned higher weightage with respect to the risk index, more recent execution may be assigned higher weightage with respect to the risk index, the test case with failures may be assigned higher weightage with respect to the risk index, the test case associated with complex domains may be assigned higher weightage with respect to the risk index, the test case with high priority flag may be assigned higher weightage with respect to the risk index, the test case with higher effort saving via automation (compared to manual execution time) may be assigned higher weightage with respect to the risk index and vice versa.

The risk index calculation is an iterative process which may be triggered periodically (for example, every night). Any new test case added to the test suite in the day may be assigned a risk index and all other risk indices may be recalculated to make total sum equal to 100. In other words, the risk indices of existing test cases may be readjusted to accommodate the risk index of the new test case. It may be noted that since the age of defect, count, execution count, and failed count of the plurality of test cases may change with time (for example, daily), periodic recalculation is, therefore, required.

The test case execution engine 212 may be configured to execute a set of priority test cases from the plurality of test cases based on the execution order and a predefined threshold risk escape value. The risk escape value is a sum of risk indices of unexecuted test cases starting from bottom of the execution order. Upon execution of the set of priority test cases, the risk escape value reaches the predefined threshold risk escape value and execution of remaining of the plurality of test cases is halted. Further, the execution of the set of priority test cases may include, dynamically modifying the execution order upon a failed execution of a test case to execute one or more related test cases prior to executing subsequent test cases in the execution order. The one or more related test cases may be within a domain of the test case with failed execution.

In an embodiment, the test case execution engine 212 may be configured to predict a failed execution of one or more subsequent test cases in the execution order upon a failed execution of a test case using an AI model based on test logs of the test case. By way of an example, let's say the test case execution engine 212 encounters a failed test case of the product under test. The failed test case may then be analyzed by the AI model which may predict the one or more subsequent test cases similar to the failed test case. In some embodiments, the test execution engine 212 may be configured to identify errors during execution of the plurality of test cases based on error tags in test logs of the plurality of test cases in real-time. Further, the test case execution engine 212 may block the one or more subsequent test cases from execution and include other test cases which are lower in the execution order. Also, based on the current failed test case, the test case execution engine 212 may increase risk priority of one or more test cases in the execution order which belong to same feature/tag/domain. Further, the test case execution engine 212 may perform dynamic reorder of the execution order to bring the one or more test cases forward in the execution order to provide adequate risk coverage.

For each of the one or more predicted subsequent test cases, the test case execution engine 212 may be further configured to dynamically modify the execution order to execute one or more related test cases prior to executing subsequent test cases in the execution order. The one or more related test cases are within a domain of the predicted test case. By way of an example, upon predicting the test cases, the test case execution engine 212 may modify the execution order in a way such that the predicted test cases are moved to the next in line in the execution order.

In some embodiments, the test case execution engine 212 may be configured to monitor an error code returned from an API for each step of a test case. Further, the test case execution engine 212 may identify a set of test cases from subsequent test cases to skip execution of the set of test cases based on the error code returned. In simpler words, the test case execution engine 212 may skip some of the test cases in the execution order based on the error logs. The skipped test cases are the test cases which may fail based on return value of executed APIs, or are subsets of executed test cases.

The chart rendering engine 214 may be configured to dynamically render one or more live charts based on a current risk escape value upon execution of each of the set of priority test cases via a GUI in real-time. The one or more live charts may include a live risk escape value chart, a live risk burndown value chart, and the like. The one or more live charts may be updated after execution of each of the set of priority test cases. Further, the chart rendering engine 214 may render the risk index of each of the plurality of test cases via the GUI. Thus, a tester may trigger the test case execution using the system 200 by providing the predefined threshold risk escape value. Further, a dynamic smart test suite (including the set of priority test cases) may be generated for current execution and a live risk burndown chart may be displayed on the screen via the GUI.

A live risk burndown chart may include a risk burn down line. This is further explained in conjunction with FIG. 8. After completion of each test case execution, remaining risk percentage (i.e., sum of risk indices of remaining of the plurality of test cases) will fall by an amount equal to the risk index of that test case. This approach may allow a testing team to cover more risk by executing fewer test cases in early cycle. When the remaining risk percentage is equal to the predefined threshold risk escape value, the test case execution will stop.

It should be noted that all such aforementioned engines 208-214 may be represented as a single module or a combination of different modules. Further, as will be appreciated by those skilled in the art, each of the engines 208-214 may reside, in whole or in parts, on one device or multiple devices in communication with each other. In some embodiments, each of the engines 208-214 may be implemented as dedicated hardware circuit comprising custom application-specific integrated circuit (ASIC) or gate arrays, off-the-shelf semiconductors such as logic chips, transistors, or other discrete components. Each of the engines 208-214 may also be implemented in a programmable hardware device such as a field programmable gate array (FPGA), programmable array logic, programmable logic device, and so forth. Alternatively, each of the engines 208-214 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module, and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for smart test execution in a network test automation platform. For example, the exemplary computing device 102 may execute test cases in a network test automation platform by the processes discussed herein. In particular, as will be appreciated by those of ordinary skill in the art, control logic and/or automated routines for performing the techniques and steps described herein may be implemented by the computing device 102 either by hardware, software, or combinations of hardware and software. For example, suitable code may be accessed and executed by the one or more processors on the computing device 102 to perform some or all of the techniques described herein. Similarly, application specific integrated circuits (ASICs) configured to perform some or all of the processes described herein may be included in the one or more processors on the computing device 102.

Figure 3:
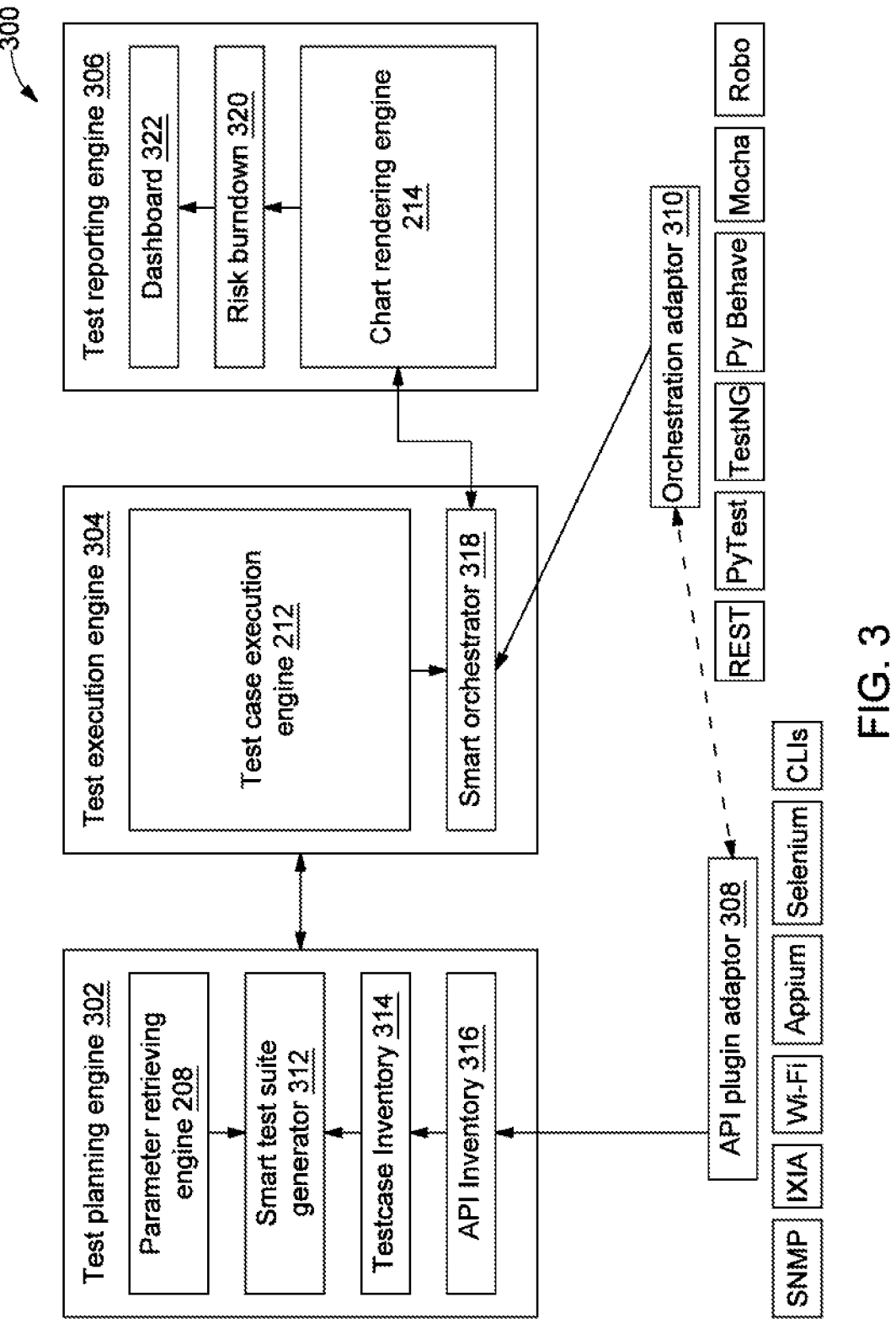
FIG. 3 illustrates a functional block diagram of an exemplary system for smart test execution in a network test automation platform, in accordance with some embodiments of the present disclosure.

FIG. 3 is an exemplary system 300 for smart test execution in a network test automation platform, in accordance with some embodiments of the present disclosure. FIG. 3 is explained in conjunction with FIGS. 1-2. The system 300 may be analogous to the system 200. The system 300 may be implemented by the computing device 102 of the system 100. In some embodiments, the system 300 may include a test planning engine 302, a test execution engine 304, a test reporting engine 306, an API plugin adaptor 308, and an orchestration adaptor 310.

The test planning engine 302 of the system 300 may be configured to plan and manage the set of test cases of a test suite for automated testing of a product under test. In some embodiments, the test planning engine 302 may include a plurality of engines to perform a plurality of functions to generate the set of test cases of the test suite. The plurality of engines may include the parameter retrieving engine 208, a smart test suite generator 312, a test case inventory 314, and an API inventory 316. The parameter retrieving engine 208 of the test planning engine 302 may be analogous to the parameter retrieving engine 208 of the computing device 102 of the system 200.

In an embodiment, the test case inventory 314 may be configured to store the test suite corresponding to the product under test based on the SKU of the product, documentation of the product, previously failed test cases, etc. The API inventory 316 may be configured to identify each of the plurality of API's deployed in the product under test. Further, the API inventory 316 may also store the related information of each of the plurality of API's i.e., the critical errors, failed test cases of the API, etc. In some embodiments, the test case inventory 314 and the API inventory 316 may generate a list of test cases which may be either retrieved from a plurality of sources or inputted by the user.

Further, the parameter retrieving engine 208 may be configured to retrieve a set of parameter values for each of a plurality of test cases corresponding to a set of risk parameters based on a latest release of a product code as explained in detail in FIG. 2.

In some embodiments, the smart test suite generator 312 may receive, the list of test cases from the test case inventory 314 and the API inventory 316, and the set of parameter values for each of the plurality of test cases from the parameter retrieving engine 208. Further, the smart test suite generator 312 may be configured to generate a dynamic test suite corresponding to the product under test which may include a corresponding risk index. In simpler words, the smart test suite generator 312 may generate a test suite with a dynamically defined execution order based on the risk index. The smart test suite generator 312 is further explained in detail in FIG. 4.

The test execution engine 304 of the system 300 may be configured to execute the dynamic test suite generated by the test planning engine 302. The test execution engine 304 may include the test case execution engine 212, and a smart orchestrator 318. The test case execution engine 212 may be configured to execute the test cases in order of the defined execution order by the smart test suite generator 312. The test case execution engine 212 of the test execution engine 304 may be analogous to the test case execution engine 212 of the system 200. The test execution engine 304 is further explained in detail in FIGS. 5-6.

In some embodiments, the smart orchestrator 318 may be configured to integrate the test execution engine 304 and the test reporting engine 306 of the system 300. The smart orchestrator 318 may manage and monitor the integrations centrally, and add capabilities for message routing, security, transformation, and reliability in the system 300. Further, the smart orchestrator 318 may be configured to coordinate and manage systems or engines across multiple cloud vendors and domains.

The test reporting engine 306 of the system 300 may be configured to generate and display the test results along with a real-time chart via a GUI. The test reporting engine 306 may receive the execution results of the test cases from the test execution engine 304 via the smart orchestrator 318. The test reporting engine 306 may include a plurality of engines to perform a plurality of functions to generate a plurality of real-time charts. The plurality of engines may include a dashboard 320, a risk burndown 322, and the chart rendering engine 214.

The chart rendering engine 214 may receive the test cases results from the smart orchestrator 318. The chart rendering engine 214 may then generate a chart based on the test case results. The chart rendering engine 214 of the test reporting engine 306 may be analogous to the chart rendering engine 214 of the system 200. Further, the chart rendering engine 214 is explained in detail in FIG. 2.

Further, the risk burndown 322 is a tool that may be used to show graphically how risk index may affect the execution of the plurality of test cases. The risk burndown 322 may be designed to show risks that may be detrimental to the project as well as risks that could improve the project's completion. It should be noted that the project means the execution of the test cases of the test suite in the execution order. Further, the dashboard 322 may be configured to display the charts generated by the chart rendering engine 214 and the risk burndown 322 via the GUI. The dashboard 322 may acts as a communication interface between the user and the system 300. Further, the dashboard 322 may be configured to display the test cases, the associated risk index, the parameter values corresponding to the parameters, etc., to the user.

The API plugin adaptor 308 of the system 300 may be configured to integrate the API inventory 316 within the test planning engine 302. The API plugin adaptor 308 may allow a plurality of API plugin to integrate within the computing device 102. The API plugin adaptor 308 may include, but not limited to, a SNMP, an IXIA, a wi-fi, etc. The orchestration adaptor 310 of the system 300 may be configured to provide an interface between the smart orchestrator 318, the test reporting engine 306 and the API plugin adaptor 308. The orchestration adaptor 310 may establish connections and facilitate communication between the system 300 and various third party systems i.e., the API's. The orchestration adaptor 310 may include, but not limited to, REST, PyTest, TestNG, Py Behave, Mocha, Robo, and the like.

Figure 4:
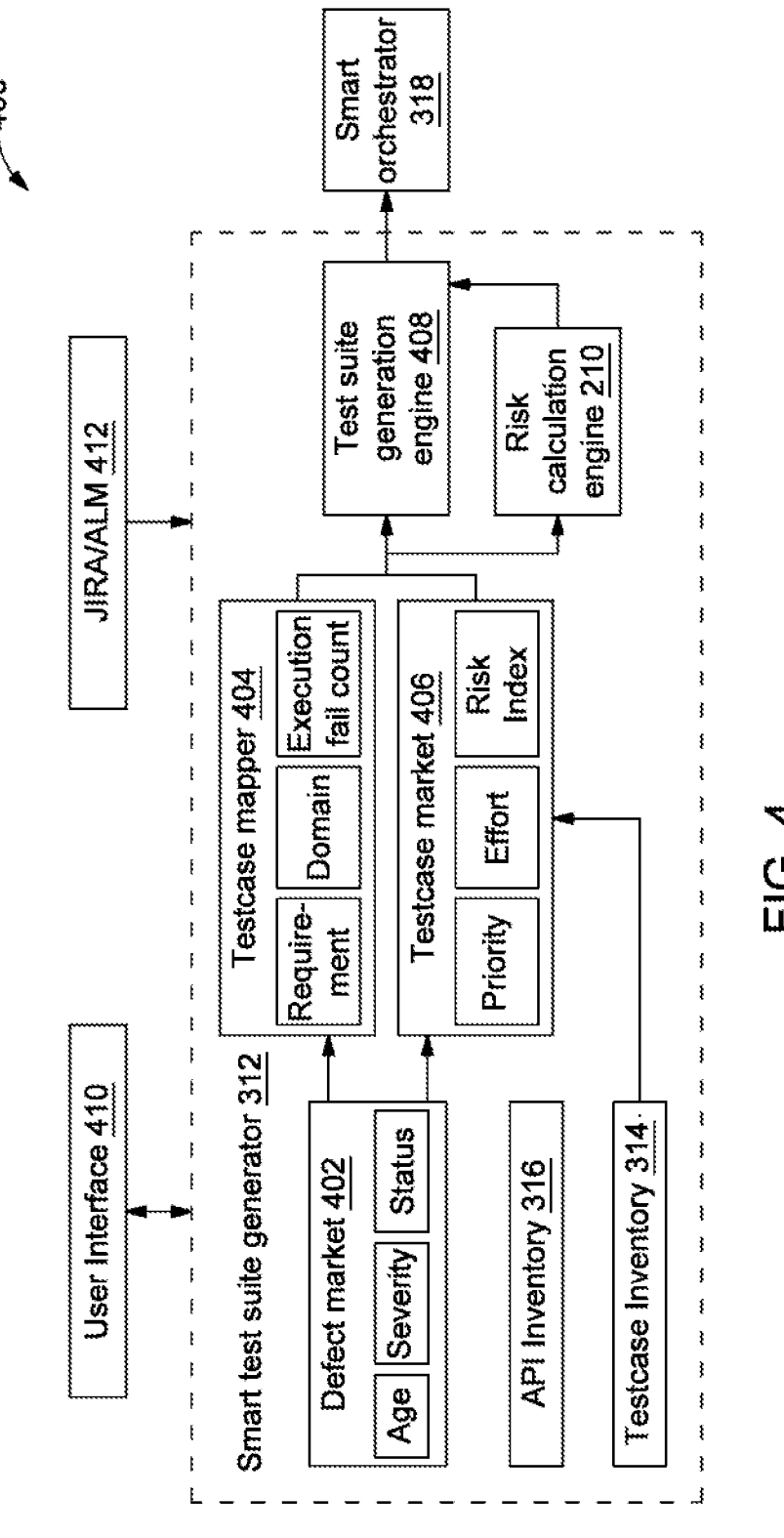
FIG. 4 illustrates an exemplary system for generating a plurality of test cases of a test suite, in accordance with some embodiments of the present disclosure.

FIG. 4 is an exemplary system 400 for generating a set of test cases of a test suite, in accordance with some embodiments of the present disclosure. FIG. 4 is explained in conjunction with the FIG. 1-3. The system 400 may be analogous to the system 200. The system 400 may include a user interface 410, a JIRA/ALM 412, the smart test suite generator 312, and the smart orchestrator 318. The smart test suite generator 312 of the system 400 is analogous to the smart test suite generator 312 of the test planning engine 302 of the system 300.

The smart test suite generator 312 may be configured to generate a dynamic test suite of a plurality of test cases for a product under test based on the details of the product, the documentation of the product, and the associated parameters with the test cases. The smart test suite generator 312 may include the API inventory 316, the API inventory 314, a defect marker 402, a test case mapper 404, a test case marker 406, the risk index calculation engine 210, a test suite generation engine 408.

The test case inventory 314 and the API inventory 316 may include a plurality of test cases associated with the product under test. The test case inventory 314 and the API inventory 316 may act as a database for the plurality of test cases which may be edited based on the product under test, error in the product, or etc. Further, the plurality of test cases may be assigned a parameter values corresponding to the parameters associated with each of the test case.

In some embodiments, the JIRA/ALM 412 may be integrated with the smart test suite generator 312 to allow the users to import and export the information of the product under test. The JIRA 412 may be a bug tracking tool that allows software developers to plan, track and work faster. The JIRA 412 may be the main source of information for future software release. Developers may plan new features to be added and bugs to be fixed in the next release of the product under test. The JIRA 412 may also act as an interface between the bug tracking and the computing system 102. The user may also import the test cases to the smart test suite generator 312 associated with the bugs and errors identified by the JIRA 412.

In an embodiment, the defect marker 402 of the system 400 may be configured to assign the parameters values corresponding to the plurality of parameters associated with each of the plurality of test cases. The defect marker 402 may assign the parameters values of the parameters i.e., an age of the test case, a severity of the test case, and the status of the test case.

In an embodiment, the test case mapper 404 of the system 400 may be configured to assign the parameters values corresponding to the plurality of parameters associated with each of the plurality of test cases. The test case mapper 404 may assign the parameters values of the parameters i.e., a requirement of the test case, a domain of the test case, and the failure count of the test case.

In an embodiment, the test case marker 406 of the system 400 may be configured to assign the parameters values corresponding to the plurality of parameters associated with each of the plurality of test cases. The test case marker 406 may assign the parameters values of the parameters i.e., a priority of the test case, an effort saved in automating the test case, and the risk index of the test case.

In some embodiments, the risk index calculation engine 210 may be configured to generate a risk index for each of the plurality of the test cases based on the defect marker 402, the test case mapper 404, and the test case marker 406. In one embodiment, the risk index calculation engine 210 may generate the risk indices in a way that the sum of the risk index of each of the plurality of test cases is 100.

In some embodiments, the test suite generation engine 408 may be configured to arrange the plurality of test cases in an execution order of the test cases. The execution order may be in a descending order of the risk index associated with the test cases. In simpler words, the test cases with highest associated risk index value may be executed first.

In an exemplary embodiment, the product under test may include a large master test suite which may include a plurality of test cases executed in the development life cycle of the product. The smart test suite generator 312 may eliminate the duplicate test cases from the test suite in order to reduce the run time of the test suite. Further, the test suite may be mapped with the requirement metrics for the coverage and highlight missing areas so that test team can work on it to fill the gaps. It should be noted that the test suite generation is the iterative process that may iterate based on a frequency as per the requirement.

Figure 5:
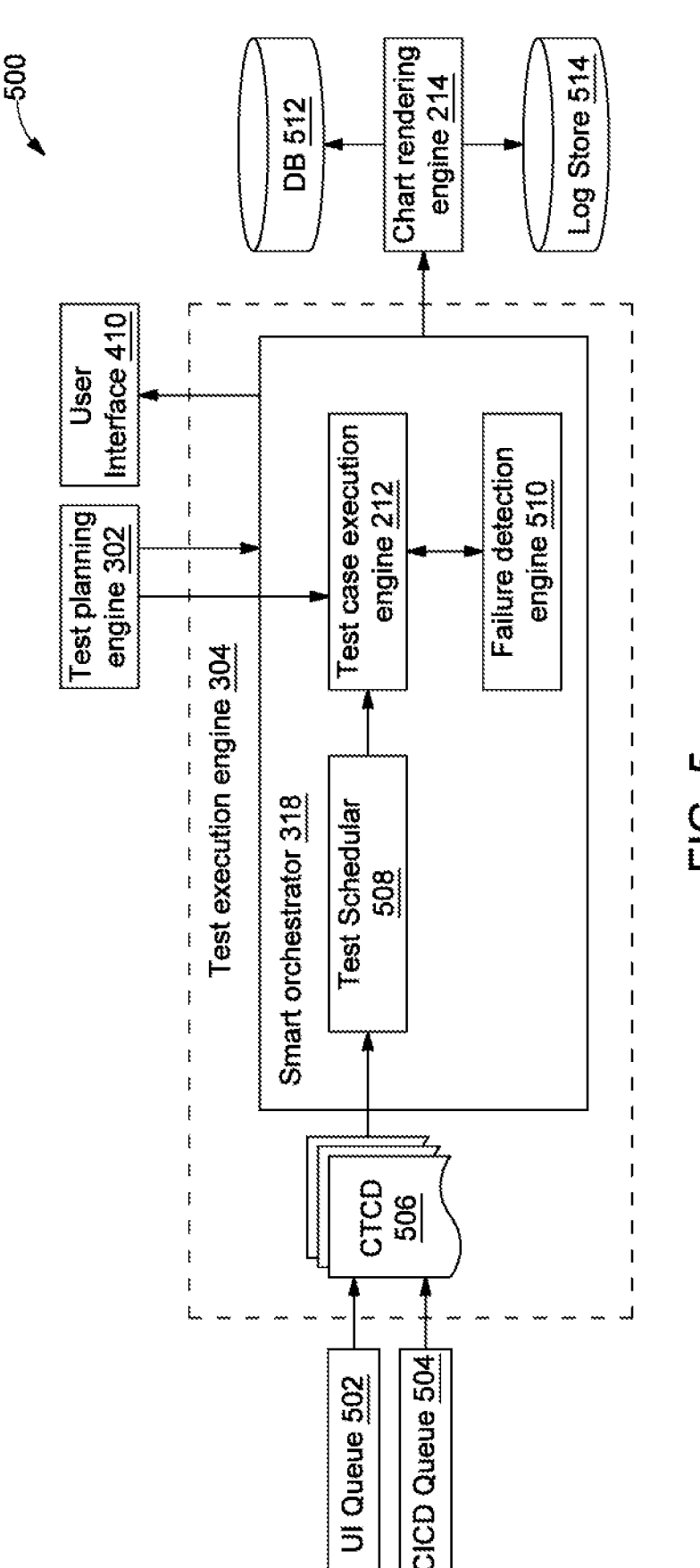
FIG. 5 illustrates an exemplary system for executing priority test cases of the test suite, in accordance with some embodiments of the present disclosure.

FIG. 5 is an exemplary system 500 for executing the plurality of test cases of the test suite, in accordance with some embodiments of the present disclosure. FIG. 5 is explained in conjunction with FIG. 1-4. The system 500 may be analogous to the system 200. The system 500 may include a user interface 410, the test planning engine 302, the test execution engine 304, the chart rendering engine 214, a UI queue 502, a continuous integration/continuous delivery (CICD) queue 504, a database 512, and a log store 514. Further, the test execution engine 304 may include, a continuous testing/continuous development (CTCD) 506, and the smart orchestrator 318. Further, the smart orchestrator 318 may include a test scheduler 508, a test case execution engine 212, and a failure detection engine 510.

The test planning engine 302 may be configured to transmit the test suite along with the execution order to the test execution engine 304 as explained in detail in FIG. 4. In some embodiments, the UI queue 502 and the CICD queue 504 may be configured to prompt a plurality of codes to execute the plurality of test cases via the test execution engine 304. The UI queue 502 and the CICD queue 504 may include a plurality of test scripts corresponding to the plurality of test cases. The CTCD 506 may receive the UI queue 502 and the CICD queue 504 and may enable a continuous feedback mechanism for test cycle/development cycle automation.

Further, the smart orchestrator 318 may be configured to execute the plurality of test cases of the test suite. The smart orchestrator 318 may receive the test script by the UI queue 502 and the CICD queue 504, and the plurality of test cases of the test suite by the test planning engine 302. Further, the test scheduler 508 may schedule the execution of the plurality of test cases. The test scheduler 508 may schedule time interval of execution, updating of the test cases, etc.

In some embodiments, the test case execution engine 212 may be configured to execute each of the plurality of test cases of the test suite in the execution order as explained in detail in FIG. 4. In some embodiments, the failure detection engine 510 may be configured to detect the failed test cases from the test case execution engine 212. The failure detection engine 510 may then render the failed test cases via a GUI/User interface 410.

In an embodiment, the smart orchestrator 318 may transmit the information related to the execution of the test cases to the chart rendering engine 214. The chart rendering engine 214 may be configured to generate a chart in real-time based on the information received from the smart orchestrator 318 as explained in detail in conjunction with FIG. 6. Further, the chart generation engine 214 may store the charts and the test cases execution information in the database 512. The database 512 may be, but not limited to, a cloud based database, a hard disk, a server, or the like. The failed test cases from the execution may be stored in the log store 514 of the system 500. The log store 514 may keep the record of the failed test cases which may be further used to modify the product under test.

Figure 6:
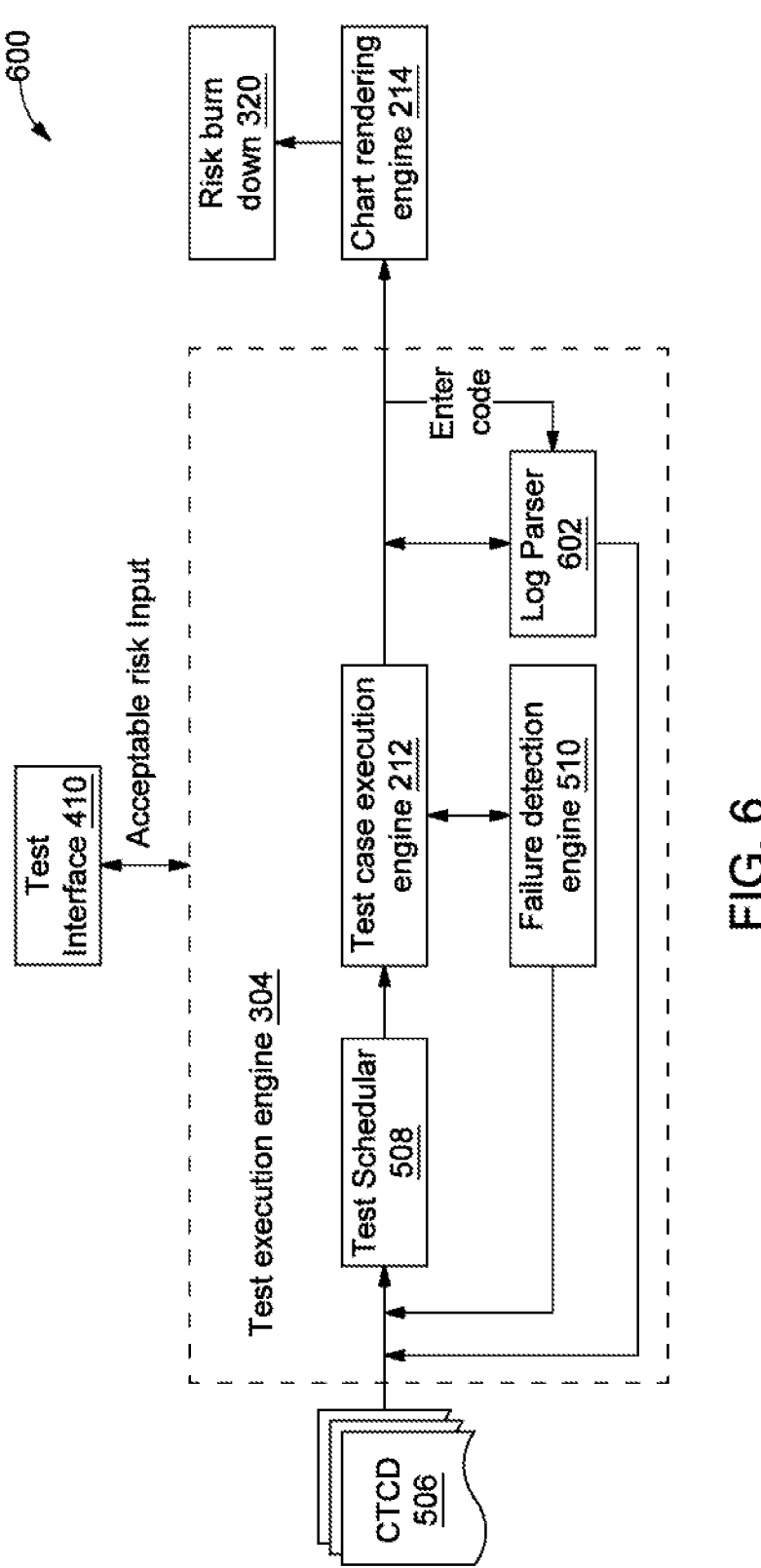
FIG. 6 illustrates an exemplary system for executing priority test cases of the test suite, in accordance with some embodiments of the present disclosure.

FIG. 6 is an exemplary system 600 for executing the plurality of test cases of the test suite, in accordance with some embodiments of the present disclosure. FIG. 6 is explained in conjunction with the FIGS. 1-5. The system 600 may be analogous to the system 200. In an embodiment, the system 600 may include the CTCD 506, the user interface 410, the test execution engine 304, the risk burndown 320, and the chart rendering engine 214. Further, the test execution engine 304 may include the test scheduler 508, the test case execution engine 212, the failure detection engine 512, and a log parser 602. The system 600 may be analogous to the system 300.

In some embodiments, the test execution engine 304 may be configured to execute the test suite in the execution order as explained in detail in FIG. 5. In an embodiment, if the failed test cases from the test case execution engine 212 are detected by the failure detection engine 512, the failure detection engine 512 may send the failed test cases to the test scheduler 508 which may dynamically modify the execution order based on the received failed test cases. The log parser 602 may monitor the live test logs for the errors in executed test cases, based on associated error tags (tokens). Further, the log parser 602 may transmit the execution details of the test cases to the test scheduler 508 which may dynamically modify the execution order based on the received information.

In some embodiments, the test scheduler 508 may predict the test cases that may have high probability of failure similar to the failed test cases detected by the failure detection engine 512. The predicted test cases may be then moved to the next in execution in the execution order of the test suite.

In some embodiments, the test case execution engine 212 may include a predefined threshold risk escape value. The risk escape value is defined as the sum of the risk indices of unexecuted test cases starting from bottom of the execution order. Further, the test case execution engine 212 may stop executing test case, when the risk escape value reaches the predefined threshold risk escape value.

In some embodiments, the test execution engine 304 identify the errors during execution of the plurality of test cases based on error tags in test logs of the plurality of test cases. It should be noted that the test logs are kept in the log parser 602 of the system 600. The test execution engine 304 may monitor an error code returned from an API for each step of the execution of the test case. Further, the test execution engine 304 may identify the set of test cases from the execution order to skip the execution of the set of test cases based on the error code.

Figure 7:
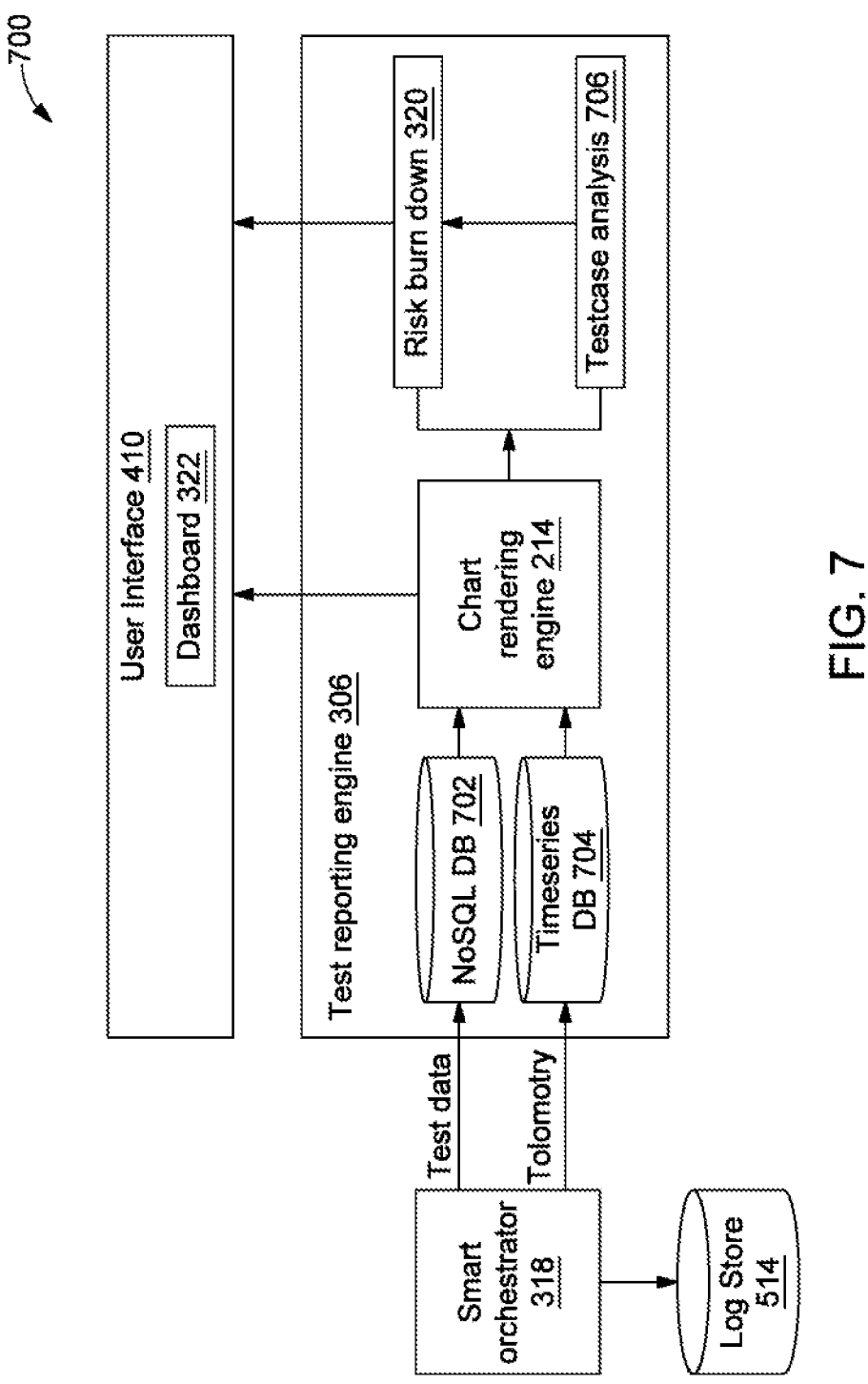
FIG. 7 illustrates an exemplary system for dynamically rendering live charts corresponding to execution of the plurality of test cases of the test suite, in accordance with some embodiments of the present disclosure.

FIG. 7 is an exemplary system 700 for rendering one or more live charts corresponding to the execution of the plurality of test cases of the test suite, in accordance with some embodiments of the present disclosure. FIG. 7 is explained in conjunction with the FIGS. 1-6. The system 700 may be analogous to the system 200. In an embodiment, the system 700 may include the test reporting engine 306, the smart orchestrator 318, the log store 514, and the user interface 410. Further, the test reporting engine 306 may include the chart rendering engine 214, the risk burndown 320, a NoSQL database (DB) 702, a Timeseries DB 704, and a test case analysis engine 706.

In some embodiments, the test reporting engine 306 may be configured to dynamically render one or more live charts (for example, a live risk burndown value chart, a live risk escape value chart, or the like) based on a current risk escape value upon execution of each of the set of priority test cases via the User Interface (UI) 410. The test reporting engine 306 may receive the test execution data from the smart orchestrator 318. Further, the NoSQL DB 702 and Timeseries DB 704 may pre-process the received data in an ordered data and transmits the ordered data to the chart rendering engine 214. It should be noted that the test execution data may include, but may not be limited to, the risk indices, the timestamps of execution of the test cases, the frequency of execution, the risk escape value, and the like.

Figure 8:
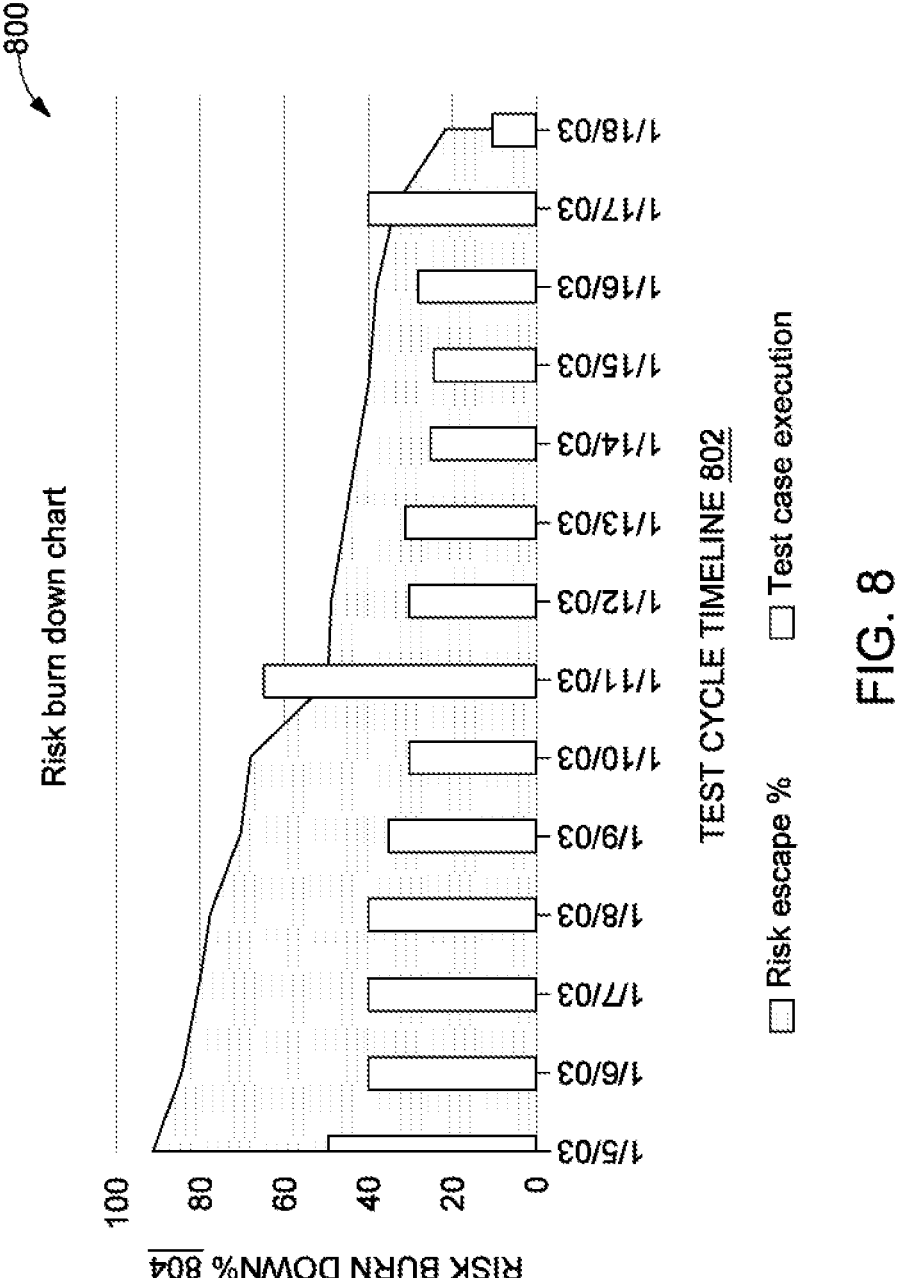
FIG. 8 illustrates an exemplary live risk burndown chart corresponding to execution of the set of priority test cases, in accordance with some embodiments of the present disclosure.

Further, the chart rendering engine 214 may generate a risk burndown chart based on the received test execution data as explained in detail in FIG. 8. The chart rendering engine 214 may include Kibana or Grafana to visualize the data based on the Timeseries DB 704 telemetry data. The Kibana or Grafana is a platform for visualizing and analyzing time series data stored in the Timeseries DB 704.

The chart may be further analyzed based on the user requirement and may be presented in a variety of scales for better visualization. In an embodiment, the risk burndown 320 may visualize the test case data on the scale of no. of executions in a test suite and the time stamp of execution of the test suite as explained in detail in FIG. 9. In another embodiment, a test case analysis 706 may visualize the test case data based on a number of executed test cases and a number of failed test cases.

FIG. 8 is an exemplary risk burndown value chart 800 of execution of the test cases, in accordance with some embodiments of the present disclosure. FIG. 8 is explained in conjunction with the FIGS. 1-7. In an embodiment, the chart 800 may be visualized on an X-Y axis in one quadrant. The X axis 802 may include a test cycle timeline which may be the timestamps of the execution of the test cases. The Y axis 804 may include the risk burndown percentage (%) (same as the risk burndown value). The bar chart in the risk burndown chart 800 may depict the number of test case executions per day.

In some embodiments, the risk burndown chart 800 depicts a live risk escape value in a test execution cycle. The chart 800 may be updated upon executing each of the set of priority test cases in the execution order. In an exemplary embodiment, at the beginning of the test cycle when no test case is executed, the risk escape value (i.e., risk escape percentage) is 100%. When the execution is started, the risk escape value may start to decline. After each test case execution, current risk escape value decreases by the risk index of the executed test case. This allows a tester to monitor risk coverage of a test suite in real-time. Further, before the completion of the execution of the test cases, the test case execution may be halted based on the predefined threshold risk escape value. For example, if the predefined threshold risk escape value is 20%, the test case execution is halted when the risk escape value reaches 20%. Thus, execution of each of the plurality of test cases is not required. A reasonable level of risk coverage may be obtained by executing test cases with higher risk index, thus saving time in test case execution of a test suite.

Figure 9:
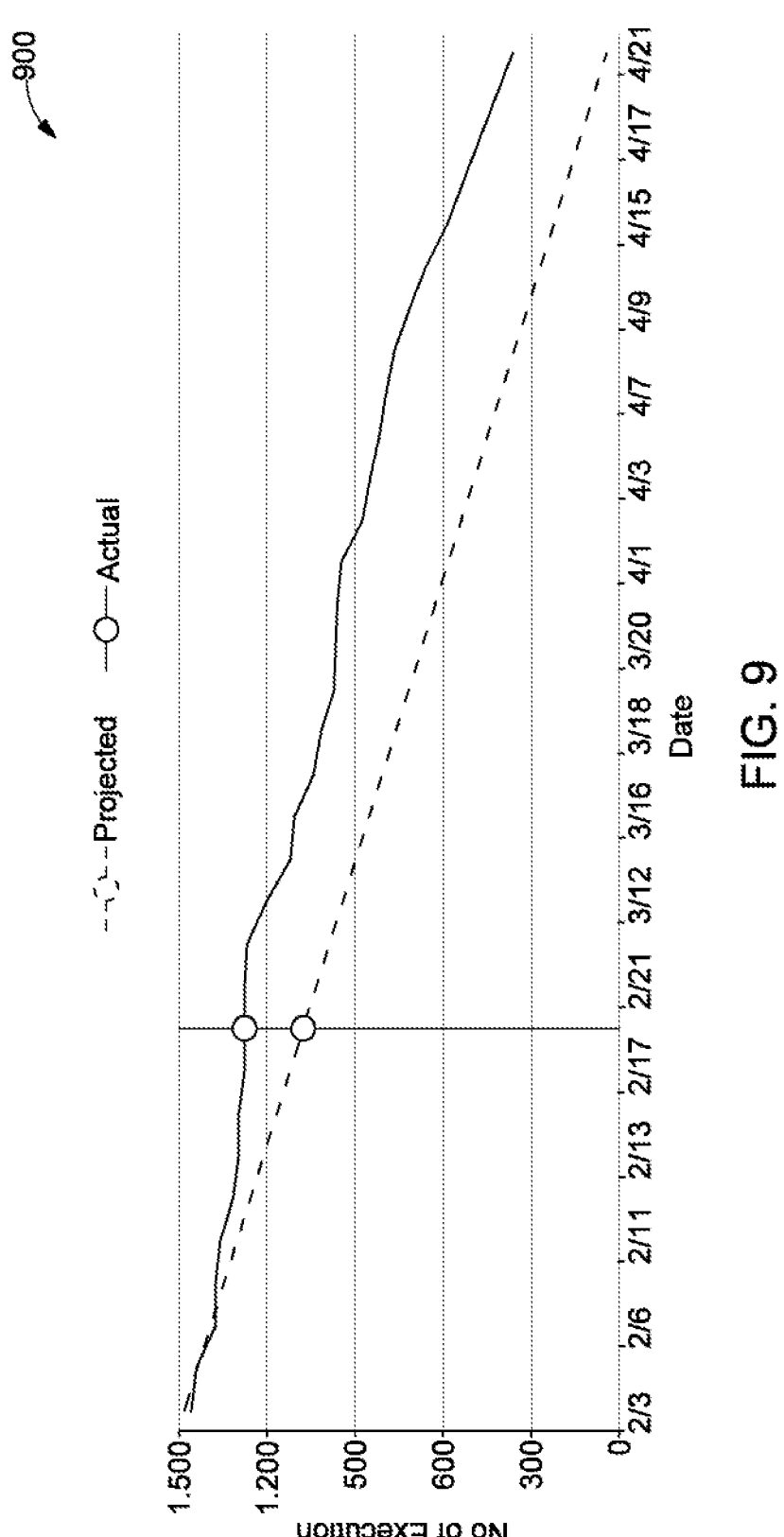
FIG. 9 illustrates an exemplary risk burndown analysis of execution of the set of priority test cases, in accordance with some embodiments of the present disclosure.

FIG. 9 is an exemplary risk burndown analysis 900 of execution of the test cases, in accordance with some embodiments of the present disclosure. FIG. 9 is explained in conjunction with the FIGS. 1-8. In an embodiment, the chart 900 may be visualized on an X-Y axis in one quadrant. The X axis 902 may include a test cycle timeline which may be the timestamps of the execution of the test cases. The Y axis 904 may include a total number of executions of the test cases. The chart 900 may include two line charts, a projected line chart 906, an actual line chart 908.

In some embodiments, the projected line chart 906 may be the ideal case of execution of the test cases. By a way of an example, if all the test cases of the test suite are executed successfully in the execution order and the test cases are equally distributed with respect to the risk index, then the burn down analysis 900 plots the projected line chart 906.

In some embodiments, the actual line chart 908 may be the general case of execution of the test cases. By a way of an example, if at least one of the test cases of the test suite failed to execute or the test cases are not equally distributed with respect to the risk index, then the burn down analysis 900 plots the actual line chart 908. It should be noted that dynamically modifying the execution order of the test cases cause the actual line graph to deflect from the projected line graph 906.

FIG. 10 is a flow diagram that depicts an exemplary process 1000 for smart test execution in a network test automation platform, in accordance with an exemplary embodiment of the present disclosure. Each step of the process 1000 may be executed by a computing device (such as the computing device 102). FIG. 10 is explained in conjunction with FIGS. 1-9.

At step 1002, a latest release of the product code and release related documents may be scanned via an Artificial Intelligence (AI) model.

At step 1004, changes in the product code and critical domains from a plurality of domains may be identified for test case execution. The critical domains are assigned a higher weightage score than remaining of the plurality of domains during risk index calculation for latest product release.

At step 1006, a set of parameter values for each of a plurality of test cases in a test suite corresponding to a set of risk parameters may be retrieved through the parameter retrieving engine 208 based on a latest release of a product code. The set of risk parameters includes defect count, defect age, defect severity, execution count, execution pattern, failed test cases, domain, priority, and effort saving per execution.

At step 1008, a risk index for each of the plurality of test cases may be calculated by the risk index calculation engine 210 based on the set of parameter values and the predefined set of weightage scores.

At step 1010, an execution order of the plurality of test cases may be determined by the test case execution engine 212 based on the calculated risk index. The execution order may be arranged in a way that the test cases with higher risk indices may be placed on top of the execution order.

At step 1012, a set of priority test cases from the plurality of test cases may be executed by the test case execution engine 212 based on the execution order and a predefined threshold risk escape value. The risk escape value is a sum of risk indices of unexecuted test cases starting from bottom of the execution order. Upon execution of the set of priority test cases, the risk escape value reaches the predefined threshold risk escape value and execution of remaining of the plurality of test cases is halted. The execution of the set of priority test cases may include dynamically modifying the execution order upon a failed execution of a test case to execute one or more related test cases prior to executing subsequent test cases in the execution order. It may be noted that the one or more related test cases may be within a domain of the test case with failed execution.

At step 1014, a failed execution of one or more subsequent test cases in the execution order may be predicted by the test case execution engine 212 upon a failed execution of a test case using an AI model based on test logs of the test case.

Further, for each predicted test case of the one or more predicted subsequent test cases, at step 1016, the execution order may be dynamically modified to execute one or more related test cases prior to executing subsequent test cases in the execution order. The one or more related test cases are within a domain of the predicted test case.

At step 1018, one or more live charts may be dynamically rendered based on a current risk escape value upon execution of each of the set of priority test cases via a GUI.

In some embodiments, the process 1000 may include identifying in real-time, errors during execution of the plurality of test cases based on error tags in test logs of the plurality of test cases. Additionally, in some embodiments, the process 1000 may include monitoring an error code returned from an API for each step of a test case. Further, the process 1000 may include identifying a set of test cases from subsequent test cases to skip execution of the set of test cases based on the error code returned.

Figure 11:
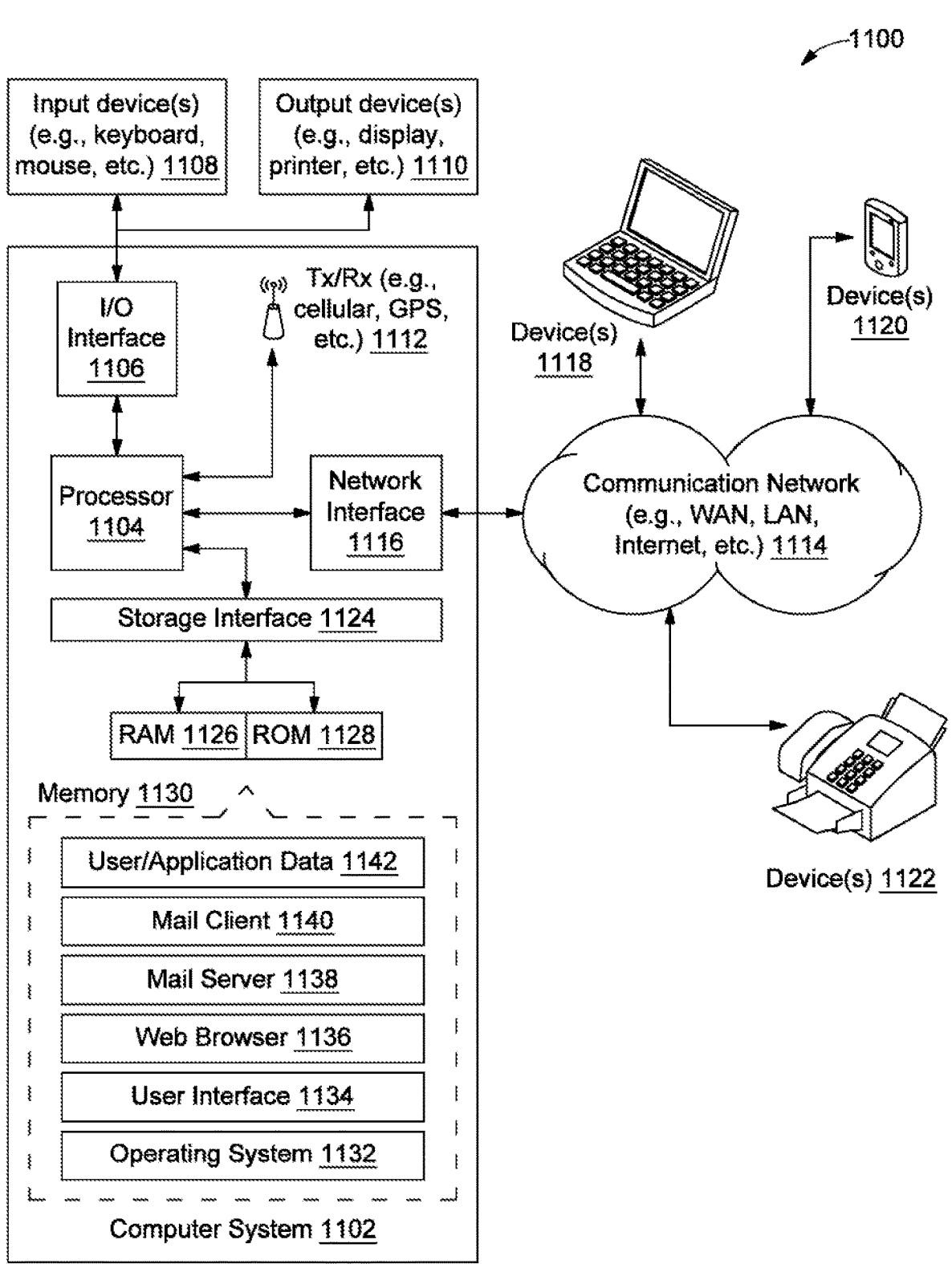
FIG. 11 illustrates a block diagram of an exemplary computer system for implementing embodiments consistent with the present disclosure.

The disclosed methods and systems may be implemented on a conventional or a general-purpose computer system, such as a personal computer (PC) or server computer. FIG. 11 is a block diagram that illustrates a system architecture 1100 of a computer system 1102 for optimizing transmission of user relevant events, in accordance with an exemplary embodiment of the present disclosure. Computer system 1102 may include a central processing unit ("CPU" or "processor") 1104. Processor 1104 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor 1104 may include a microprocessor, such as AMD® ATHLON®, DURON® OR OPTERON®, ARM's application, embedded or secure processors, IBM® POW-ERPC®, INTEL® CORE® processor, ITANIUM® processor, XEON® processor, CELERON® processor or other line of processors, etc. The processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

The processor 1104 may be disposed in communication with one or more input/output (I/O) devices via I/O interface 1106. The I/O interface 1106 may employ communication protocols/methods such as, without limitation, audio, analog, digital, monoaural, RCA, stereo, IEEE-1394, near field communication (NFC), Fire Wire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1106, the computer system 1102 may communicate with one or more I/O devices. For example, the input device 1108 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1110 may be a printer, fax machine, video display (e.g., cathode ray tube (CRT), liquid crystal display (LCD), light-emitting diode (LED), plasma, or the like), audio speaker, etc. In some embodiments, a transceiver 1112 may be disposed in connection with the processor 1104. The transceiver 1112 may facilitate various types of wireless transmission or reception. For example, the transceiver 1112 may include an antenna operatively connected to a transceiver chip (e.g., TEXAS INSTRUMENTS® WILINK WL1286®, BROAD-COM® BCM4550IUB8®, INFINEON TECHNOLO-GIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1104 may be disposed in communication with a communication network 1114 via a network interface 1116. The network interface 1116 may communicate with the communication network 1114. The network interface 1116 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1114 may include, without limitation, a direct interconnection, local area network (LAN), wide area network (WAN), wireless network (e.g., using Wireless Application Protocol), the Internet, etc. Using the network interface 1116 and the communication network 1114, the computer system 1102 may communicate with devices 1118, 1120, and 1122. These devices may include, without limitation, personal computer (s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLER, NOOK® etc.), laptop computers, notebooks, gaming consoles (MICROSOFT® XBOX®, NINTENDO® DS®, SONY® PLAYSTATION®, etc.), or the like. In some embodiments, the computer system 1102 may itself embody one or more of these devices.

In some embodiments, the processor 1104 may be disposed in communication with one or more memory devices 1130 (e.g., RAM 1126, ROM 1128, etc.) via a storage interface 1124. The storage interface 1124 may connect to memory devices 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1130 may store a collection of program or database components, including, without limitation, an operating system 1132, user interface 1134, web browser 1136, mail server 1138, mail client 1140, user/application data 1142 (e.g., any data variables or data records discussed in this disclosure), etc. The operating system 1132 may facilitate resource management and operation of the computer system 1102. Examples of operating systems include, without limitation, APPLE® MACIN-TOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACK-BERRY® OS, or the like. User interface 1134 may facilitate display, execution, interaction, manipulation, or operation of program components through textual or graphical facilities. For example, user interfaces may provide computer interaction interface elements on a display system operatively connected to the computer system 1102, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1102 may implement a web browser 1136 stored program component. The web browser 1136 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1102 may implement a mail server 1138 stored program component. The mail server 1138 may be an Internet mail server such as MICROSOFT® EXCHANGER, or the like. The mail server 1138 may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server 1138 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1102 may implement a mail client 1140 stored program component. The mail client 1140 may be a mail viewing application, such as APPLE MAIL®, MICROSOFT ENTOURAGE®, MICROSOFT OUTLOOK®, MOZILLA THUNDERBIRD®, etc.

In some embodiments, computer system 1102 may store user/application data 1142, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

The disclosure provides a practical solution for smart test execution in a network test automation platform. The method may retrieve a set of parameters values for each of a plurality of test cases in a test suite corresponding to a set of risk parameters based on a latest release of a product code. Further, the method may also calculate a risk index for each of the plurality of test cases based on the set of parameter values and the predefined set of weightage scores. The method may further determine an execution order of the plurality of test cases based on the calculated risk index. The method may further execute a set of priority test cases from the plurality of test cases based on the execution order and a predefined threshold risk escape value. The risk escape value is a sum of risk indices of unexecuted test cases starting from bottom of the execution order. The method may also halt the execution of the test cases if risk escape value reaches the predefined threshold risk escape value, upon execution of the set of priority test cases. The method may also dynamically modify the execution order upon a failed execution of a test case to execute one or more related test cases prior to executing subsequent test cases in the execution order. The method may also dynamically render one or more live charts in real-time based on a current risk escape value upon execution of each of the set of priority test cases via a GUI.

The disclosure may be applicable in software development and testing lifecycle to track the development, errors, and bugs of the product with efficiency. The disclosure may be used in defense to ensure the security and performance of their critical network infrastructure, guarding against cyber threats, and ensuring reliable communication. The disclosure may be helpful in implementing the Internet of things by ensuring that the IoT ecosystem operates smoothly by monitoring and optimizing network performance for a large number of interconnected devices. The disclosure may be applicable in the data centers to validate the effectiveness of the network infrastructure, ensuring minimal downtime and optimal data center operations.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for smart test execution in a network test automation platform, the method comprising:

retrieving, by a computing device, a set of parameter values for each of a plurality of test cases in a test suite corresponding to a set of risk parameters based on a latest release of a product code;

calculating, by the computing device, a risk index for each of the plurality of test cases based on the set of parameter values and a predefined set of weightage scores;

determining, by the computing device, an execution order of the plurality of test cases based on the calculated risk index;

executing, by the computing device, a set of priority test cases from the plurality of test cases based on the execution order and a predefined threshold risk escape value, wherein:

a risk escape value is a sum of risk indices of unexecuted test cases starting from bottom of the execution order, upon execution of the set of priority test cases, the risk escape value reaches the predefined threshold risk escape value and execution of remaining of the plurality of test cases is halted, and the executing the set of priority test cases comprises dynamically modifying the execution order upon a failed execution of a test case to execute one or more related test cases prior to executing subsequent test cases in the execution order; and dynamically rendering in real-time, by the computing device, one or more live charts based on a current risk escape value upon execution of each of the set of priority test cases via a Graphical User Interface (GUI).

2. The method of claim 1, wherein the set of risk parameters comprises defect count, defect age, defect severity, execution count, execution pattern, failed test cases, domain, priority, and effort saving per execution.

3. The method of claim 1, further comprising:

scanning, by the computing device, the latest release of the product code and release related documents via an Artificial Intelligence (AI) model; and identifying, by the computing device, changes in the product code and critical domains from a plurality of domains for test case execution, wherein the critical domains are assigned a higher weightage score than remaining of the plurality of domains during the calculation of the risk index for latest product release.

4. The method of claim 1, wherein the one or more related test cases are within a domain of the test case with failed execution.

5. The method of claim 1, further comprising predicting, by the computing device, a failed execution of one or more subsequent test cases in the execution order upon the failed execution of the test case using an AI model based on test logs of the test case.

6. The method of claim 5, further comprising, for each predicted test case of the one or more predicted subsequent test cases, dynamically modifying, by the computing device, the execution order to execute the one or more related test cases prior to executing the subsequent test cases in the execution order, wherein the one or more related test cases are within a domain of the predicted test case.

7. The method of claim 1, further comprising identifying in real-time, by the computing device, errors during execution of the plurality of test cases based on error tags in test logs of the plurality of test cases.

8. The method of claim 1, further comprising: monitoring, by the computing device, an error code returned from an Application Programming Interface (API) for each step of the test case; and identifying, by the computing device, a set of test cases from subsequent test cases to skip execution of the set of test cases based on the error code returned.

9. A system for smart test execution in a network test automation platform, the system comprising:

a processing circuitry; and a memory communicatively coupled to the processing circuitry, wherein the memory stores processor instructions, which when executed by the processing circuitry, cause the processing circuitry to:

retrieve a set of parameter values for each of a plurality of test cases in a test suite corresponding to a set of risk parameters based on a latest release of a product code;

calculate a risk index for each of the plurality of test cases based on the set of parameter values and a predefined set of weightage scores;

determine an execution order of the plurality of test cases based on the calculated risk index;

execute a set of priority test cases from the plurality of test cases based on the execution order and a predefined threshold risk escape value, wherein:

a risk escape value is a sum of risk indices of unexecuted test cases starting from bottom of the execution order, upon execution of the set of priority test cases, the risk escape value reaches the predefined threshold risk escape value and execution of remaining of the plurality of test cases is halted, and the executing the set of priority test cases comprises dynamically modifying the execution order upon a failed execution of a test case to execute one or more related test cases prior to executing subsequent test cases in the execution order; and dynamically render in real-time, one or more live charts based on a current risk escape value upon execution of each of the set of priority test cases via a Graphical User Interface (GUI).

10. The system of claim 9, wherein the set of risk parameters comprises defect count, defect age, defect severity, execution count, execution pattern, failed test cases, domain, priority, and effort saving per execution.

11. The system of claim 9, wherein the processor instructions, when executed by the processing circuitry, further cause the processing circuitry to:

scan the latest release of the product code and release related documents via an Artificial Intelligence (AI) model; and identify changes in the product code and critical domains from a plurality of domains for test case execution, wherein the critical domains are assigned a higher weightage score than remaining of the plurality of domains during the calculation of the risk index for latest product release.

12. The system of claim 9, wherein the one or more related test cases are within a domain of the test case with failed execution.

13. The system of claim 9, wherein the processor instructions, when executed by the processing circuitry, further cause the processing circuitry to predict a failed execution of one or more subsequent test cases in the execution order upon the failed execution of the test case using an AI model based on test logs of the test case.

14. The system of claim 13, wherein the processor instructions, when executed by the processing circuitry, further cause the processing circuitry to, for each predicted test case of the one or more predicted subsequent test cases, dynamically modify the execution order to execute the one or more related test cases prior to executing the subsequent test cases in the execution order, wherein the one or more related test cases are within a domain of the predicted test case.

15. The system of claim 9, wherein the processor instructions, when executed by the processing circuitry, further cause the processing circuitry to identify in real-time, errors during execution of the plurality of test cases based on error tags in test logs of the plurality of test cases.

16. The system of claim 9, wherein the processor instructions, when executed by the processing circuitry, further cause the processing circuitry to:

monitor an error code returned from an Application Programming Interface (API) for each step of the test case; and identify a set of test cases from subsequent test cases to skip execution of the set of test cases based on the error code returned.

17. A non-transitory computer-readable medium storing computer-executable instructions for smart test execution in a network test automation platform, the computer-executable instructions configured for:

retrieving a set of parameter values for each of a plurality of test cases in a test suite corresponding to a set of risk parameters based on a latest release of a product code;

calculating a risk index for each of the plurality of test cases based on the set of parameter values and a predefined set of weightage scores;

determining an execution order of the plurality of test cases based on the calculated risk index;

executing a set of priority test cases from the plurality of test cases based on the execution order and a predefined threshold risk escape value, wherein:

a risk escape value is a sum of risk indices of unexecuted test cases starting from bottom of the execution order, upon execution of the set of priority test cases, the risk escape value reaches the predefined threshold risk escape value and execution of remaining of the plurality of test cases is halted, and the executing the set of priority test cases comprises dynamically modifying the execution order upon a failed execution of a test case to execute one or more related test cases prior to executing subsequent test cases in the execution order; and dynamically rendering in real-time, one or more live charts based on a current risk escape value upon execution of each of the set of priority test cases via a Graphical User Interface (GUI).

18. The non-transitory computer-readable medium of claim 17, wherein the computer-executable instructions are further configured for:

scanning the latest release of the product code and release related documents via an Artificial Intelligence (AI) model; and identifying changes in the product code and critical domains from a plurality of domains for test case execution, wherein the critical domains are assigned a higher weightage score than remaining of the plurality of domains during the calculation of the risk index for latest product release.

19. The non-transitory computer-readable medium of claim 17, wherein the computer-executable instructions are further configured for predicting a failed execution of one or more subsequent test cases in the execution order upon the failed execution of the test case using an AI model based on test logs of the test case.

20. The non-transitory computer-readable medium of claim 19, wherein, for each predicted test case of the one or more predicted subsequent test cases, the computer-executable instructions are further configured for dynamically modifying the execution order to execute the one or more related test cases prior to executing the subsequent test cases in the execution order, wherein the one or more related test cases are within a domain of the predicted test case.

* * * * *